US012668314B2

(12) United States Patent (10) Patent No.: US 12,668,314 B2
Furuno et al. (45) Date of Patent: Jun. 30, 2026

(54) LOWER STRUCTURE OF VEHICLE

(71) Applicant: MAZDA MOTOR CORPORATION, Hiroshima (JP)

(72) Inventors: Tsuyoshi Furuno, Aki-gun (JP); Yuki Kataoka, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 280 days.

(21) Appl. No.: 18/675,634

(22) Filed: May 28, 2024

(65) Prior Publication Data

US 2025/0019008 A1     Jan. 16, 2025

(30) Foreign Application Priority Data

Jul. 10, 2023     (JP) ................................. 2023-113049

(51) Int. Cl.
*B62D 25/20* (2006.01)
*B60K 15/063* (2006.01)
(52) U.S. Cl.
CPC ........ *B62D 25/2027* (2013.01); *B60K 15/063* (2013.01); *B60K 2015/0634* (2013.01); *B60K 2015/0638* (2013.01)
(58) Field of Classification Search
CPC ............ B62D 25/2027; B62D 25/2045; B60R 19/42; B60Y 2306/01; B60K 15/063; B60K 2015/0634; B60K 2015/0638; B60K 15/067
USPC ............. 296/193.07, 193.08, 187.08, 187.11
See application file for complete search history.

(56) References Cited

U.S. PATENT DOCUMENTS

| | | | |
|---|---|---|---|
| 12,522,303 B2 * | 1/2026 | Hirazumi ............. | B62D 27/065 |
| 2016/0236713 A1 * | 8/2016 | Sakaguchi ......... | B62D 25/2036 |
| 2024/0186635 A1 * | 6/2024 | Lee ........................ | B60R 16/04 |

FOREIGN PATENT DOCUMENTS

JP          2006-123584 A          5/2006

OTHER PUBLICATIONS

KR0130149Y1 with English Translation; Lee; Dec. 14, 1998 (Year: 2026).*
JP2023177834A with English Translation; Furuno; Dec. 14, 2023 (Year: 2026).*

* cited by examiner

*Primary Examiner* — Roger L Pang
(74) *Attorney, Agent, or Firm* — Studebaker Brackett PLLC

(57)          ABSTRACT

A protection member arranged below a frame member so as to face an onboard member from an outward side, in a vehicle width direction, thereof and a support member fixed to a lower face of the frame member so as to support the protection member are provided. The support member comprises a bottom wall portion including a facing portion which faces an upper end portion of the protection member in a vertical direction and extending along a lower face of the frame member and a vertical wall portion having a base end thereof which corresponds to an inward edge of the bottom wall portion and extending downward. The vertical wall portion is provided with a curve portion protruding inward and an extension portion extending toward a tip side from the curve portion and positioned on the outward side, in the vehicle width direction, of the curve portion.

12 Claims, 10 Drawing Sheets

Left (Inward) ←——————→ Right (Outward)

Front ⟵⟶ Rear

Left (Inward) ←——————→ Right (Outward)

LOWER STRUCTURE OF VEHICLE

BACKGROUND OF THE INVENTION

The present invention relates to a lower structure of a vehicle.

As disclosed in Japanese Patent Laid-Open publication No. 2006-123584, a vehicle which is equipped with an onboard member, such as a fuel tank, at its lower part has been considered to be configured such that a protection member (a protection bar in the above-described patent document) is provided on an outward side, in a vehicle width direction, of the onboard member in order to protect the onboard member.

Specifically, this patent document discloses a structure in which the protection member which is configured to be bent downward in a crank shape (the protection bar in the patent document) is arranged on the outward side, in the vehicle width direction, of the fuel tank and fixed to a lower face of a frame member (a rear side frame in the patent document) of the vehicle. Further, it is disclosed that a middle portion of the above-described protection member is arranged below the frame member and also roughly at the same position as a bottom portion of the fuel tank.

According to the structure of the above-described patent document, when an obstacle collides with the vehicle from a vehicle side, the protection member can properly prevent a contact of the fuel tank with the obstacle, thereby protecting the fuel tank. Further, when the vehicle passes through a step or the like on a road surface, a state where there occurs a gap between the step or the like and the fuel tank can be properly maintained by the contact of the middle portion of the protection member with the step or the like, thereby preventing a contact of the fuel tank with the step or the like.

However, since the protection member disclosed in the above-described patent document is directly fixed to the lower face of the frame member, there is a problem that when the step or the like collide with the protection member, the frame member may be deformed easily when receiving its collision load.

SUMMARY OF THE INVENTION

The present invention has been devised in view of the above-described matter, and an object of the present invention is to provide a lower structure of a vehicle which can properly suppress the deformation of the frame member, protecting the onboard member.

The present invention is a lower structure of a vehicle which comprises an onboard member arranged below a floor panel of the vehicle, a frame member arranged on an outward side, in a vehicle width direction, of the onboard member, a protection member arranged below the frame member so as to face the onboard member from the outward side, in the vehicle width direction, thereof, and a support member fixed to a lower face of the frame member so as to support the protection member, wherein the support member comprises a bottom wall portion including a facing portion which faces an upper end portion of the protection member in a vertical direction and extending along the lower face of the frame member and a vertical wall portion having a base end thereof which corresponds to an inward edge, in the vehicle width direction, of the bottom wall portion and extending downward, and the vertical wall portion is provided with a curve portion protruding inward, in the vehicle width direction, and an extension portion extending toward a tip side from the curve portion and positioned on the outward side, in the vehicle width direction, of the curve portion.

According to the present invention, since the protection member is arranged at a position to face the onboard member on the outward side, in the vehicle width direction, of the onboard member and also arranged below the frame member, when any obstacle collides with the vehicle from a vehicle side or below, the contact of the onboard member with the obstacle can be prevented by the protection member, thereby protecting the onboard member. Further, in the present invention, the support member is arranged between the upper end portion of the protection member and the frame member. Accordingly, it can be prevented that the collision load is directly applied to the frame member from the protection member, so that the deformation of the frame member can be suppressed. Moreover, in addition to the bottom wall portion extending along the lower face of the frame member, the support member is provided with the vertical wall portion having its base end which corresponds to the inward edge, in the vehicle width direction, of the bottom wall portion and extending downward. Accordingly, the rigidity of the support member can be increased, so that the protection member can be stably supported by the support member, and also deformation of the support member, thereby the deformation of the frame member, can be suppressed more securely.

Additionally, the vertical wall portion is provided with the curve portion protruding inward, in the vehicle width direction, thereof, and the extension portion extending toward the tip side from the curve portion is arranged on the outward side, in the vehicle width direction, of the curve portion. Accordingly, when the vertical wall portion swings toward the inward side, in the vehicle width direction, thereof around its upper position in accordance with application of a collision load to the frame member from the outward side, in the vehicle width direction, thereof in a vehicle side collision or the like, the curve portion of the vertical wall portion can be made to contact the onboard member first. Thereby, it can be suppressed that a relatively-sharp tip of the vertical wall portion contacts the onboard member, so thereby suppressing any damage of the onboard member.

In the above-described lower structure of the vehicle, it is preferable that the support member comprise a first support member including the bottom wall portion and the vertical wall portion and a second support member made of a different member from the first support member and fixed to the lower face of the frame member, and the second support member comprise a second bottom wall portion extending along the bottom wall portion at a position which is located below the bottom wall portion or between the bottom wall portion and the frame member and including a second facing portion which faces the facing portion in the vertical direction (claim 2).

According to this structure, since the two support members (the first support member and the second support member) are arranged between the upper end portion of the protection member and the frame member. Accordingly, the deformation of the frame member can be further suppressed, compared to a case where the first support member is arranged only.

In the above-described lower structure of the vehicle, it is preferable that the second support member comprise a second vertical wall portion extending downward from an inward edge, in the vehicle width direction, of the second bottom wall portion (claim 3).

According to this structure, the rigidity of the second support member can be increased, so that the deformation of the second support member, thereby the deformation of the frame member, can be suppressed more securely.

In the above-described lower structure of the vehicle, it is preferable that a lower end of the second vertical wall portion be positioned above the curve portion (claim 4).

According to this structure, the curve portion can be made to contact the onboard member before a relatively-sharp portion of a lower end of the second vertical wall portion comes to contact the onboard member. Accordingly, it can be prevented that the onboard member is damaged by the second vertical wall portion provided at the second support member.

In the above-described lower structure of the vehicle, it is preferable that the first support member and the second support member be fastened to the frame member by a common fastening member, and the first and second support members be joined together at respective forward-and-rearward positions, in a vehicle longitudinal direction, of the fastening member (claim 5).

According to this structure, the first support member and the second support member can be fastened to the frame member by using the common fastening member. Further, the first and second support members can be integrated by joining these members at the forward-and-rearward positions of their fastening point, so that the first support member and the second support member can be stably supported at the frame member.

In the above-described lower structure of the vehicle, it is preferable that the first support member and the second support member be fastened to the frame member by the fastening member at a forward position, in the vehicle longitudinal direction, of the facing portion, and the first and second support members be joined together at a rearward position, in the vehicle longitudinal direction, of a longitudinal center of the facing portion (claim 6).

According to this structure, the first support member and the second support member are connected at the forward and rearward positions of the longitudinal center of the facing portion, i.e., the positions longitudinally interposing a center of the upper end portion of the protection member. Accordingly, the load applied to the facing portion and the second facing portion from the upper end of the protection member is stably received at two members, the first support member and the second support member. Thereby, the deformation of the first and second support members is so suppressed that the protection member can be stably supported at the support members.

In the above-described lower structure of the vehicle, it is preferable that the extension portion extend downward from the curve portion (claim 7).

According to this structure, the vertical wall portion, which has the curve portion and the extension portion extending toward the tip side from the curve portion and positioned on the outward side, in the vehicle width direction, of the curve portion, can be materialized at the support member with a simple structure.

As described above, the lower structure of the vehicle according to the present invention can properly suppress the deformation of the frame member, providing the protection member at the lower face of the frame member.

The present invention will become apparent from the following description which refers to the accompanying drawings.

DETAILED DESCRIPTION OF THE INVENTION

Figure 1:
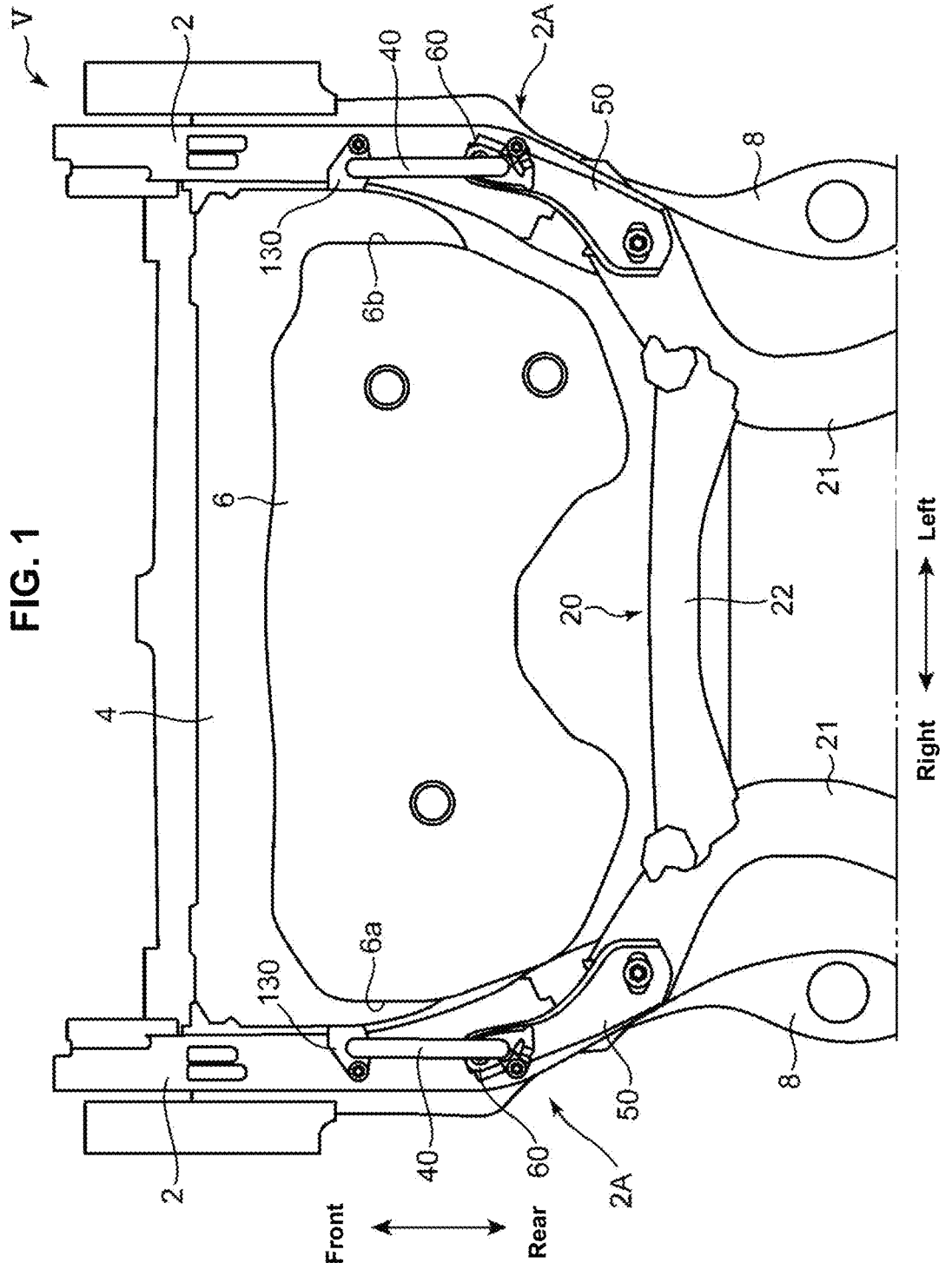
FIG. 1 is a bottom view of a part of a vehicle rear portion.
Figure 2:
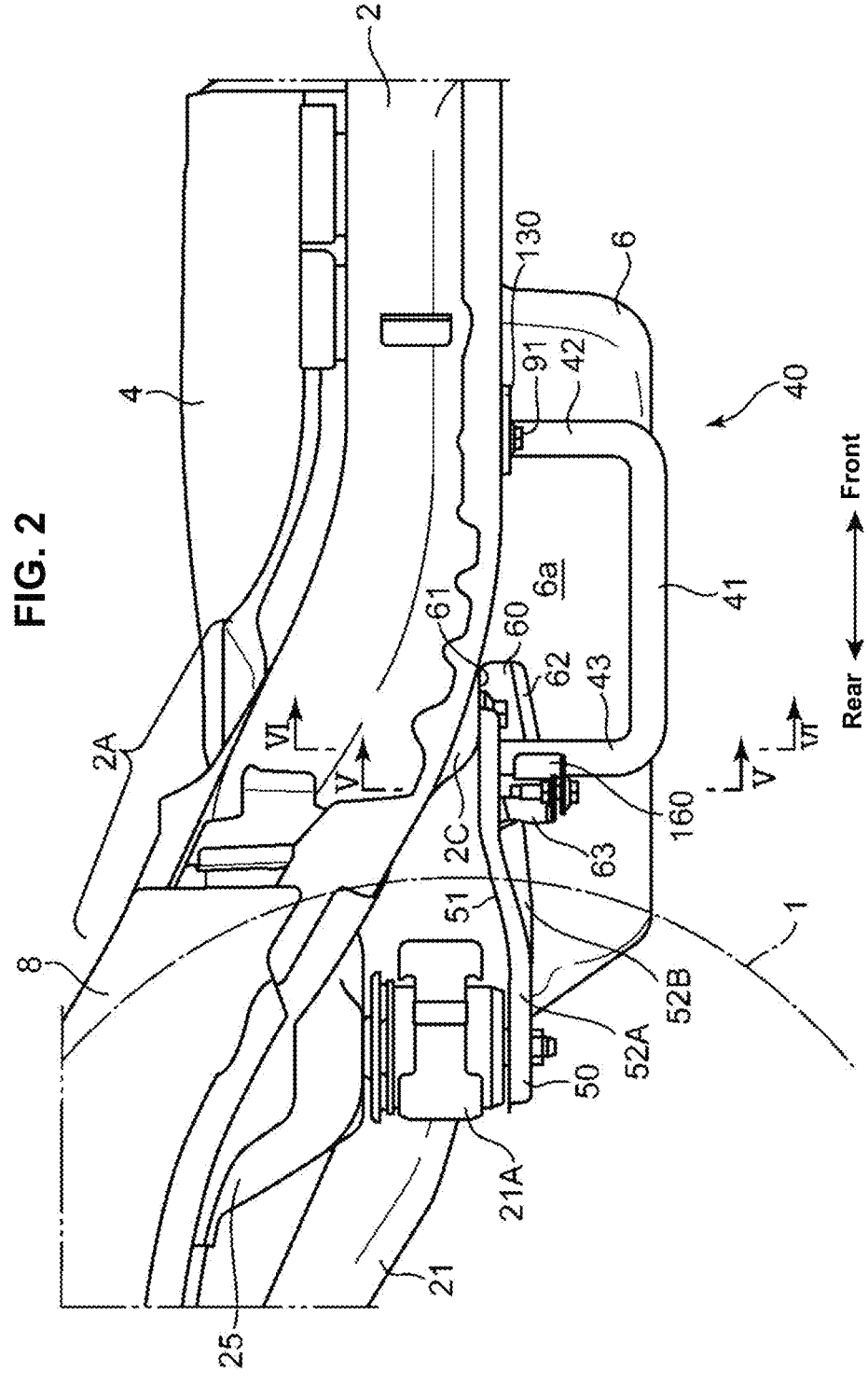
FIG. 2 is a side view of the part of the vehicle rear portion.

Hereafter, an embodiment of the present invention will be described specifically referring to the drawings. FIG. 1 is a schematic bottom view of a part of a rear portion of a vehicle V to which a lower structure according to the embodiment of the present invention is applied. FIG. 2 is a schematic side view of the part of the rear portion of the vehicle V. In the following description, a vehicle longitudinal direction is described as a longitudinal direction and a vehicle width direction is described as a lateral direction in a vehicle's forward-viewed state.

(Schematic Structure of Vehicle Rear Portion)

A pair of rear side frames 2, 2 which extend longitudinally and constitute a part of a vehicle body are provided at right-and-left both-side portions of the vehicle V. A structure of the two rear side frames 2, 2 is laterally symmetrical. The rear side frame 2 extends to near a front end of a rear wheel 1. Another part of the rear side frame 2 than its rear end portion 2A extends substantially horizontally. Meanwhile, the rear end portion 2A of the rear side frame 2 is curved such that its rear side is located at a higher level. That is, the rear end portion 2A of the rear side frame 2 is curved obliquely rearward-and-upward. A wheel house panel 8 which encloses the rear wheel 1 extends rearward from a rear end of the rear side frame 2. Herein, in the present embodiment, the rear side frame 2 is made of plural plate-shaped members. The rear side frame 2 corresponds to a "frame member" of the present invention.

A floor panel 4 to form a floor face of a cabin is provided between the two rear side frames 2, 2. A fuel tank 6 to reserve fuel is arranged in a space between the pair of rear side frames 2, 2 below the floor panel 4. In other words, the rear side frames 2, 2 are arranged on both sides, in the lateral direction, of the fuel tank 6 and extend in the longitudinal direction on both sides, in the vehicle width direction, of the fuel tank 6. The fuel tank 6 corresponds to an "onboard member" of the present invention.

The fuel tank 6 is fixed to a cross member (not illustrated) which is provided at the floor panel 4 and extends in the lateral direction. The fuel tank 6 extends in the longitudinal direction from a forward position of the rear wheel 1 to a rearward position of a front end of the rear wheel 1, and a rear portion of the fuel tank 6 overlaps the rear wheel 1 in a side view (when viewed along the lateral direction). A size, in the lateral direction, of the fuel tank 6 is set to be slightly smaller than a gap distance, in the lateral direction, of the two rear side frames 2, 2, and the fuel tank 6 occupies the most part, in the lateral direction, of an area between the rear side frames 2, 2. A size, in a vertical direction, of the fuel tank 6 is set such that a lower end of the fuel tank 6 is located below a lower end of the rear side frame 2 in a state where the fuel tank 6 is fixed below the floor panel 4. That is, the fuel tank 6 is fixed to the cross member (not illustrated) provided at the floor panel 4 and extending in the lateral direction in a state where the fuel tank 6 protrudes downward beyond the lower end of the rear side frame 2.

A suspension frame 20 to support respective suspensions (not illustrated) of a pair of right-and-left rear wheels 1 (the right-side rear wheel 1 is illustrated only) is provided at the rear portion of the vehicle V. The suspension frame 2 includes a pair of right-and-left sub fames 21, 21 and a rear-suspension cross member 22 which extends laterally between the sub frames 21, 21.

Each of the sub frames 21, 21 is connected to the rear side frame 2 via a support panel 25 described later. Specifically, the right-side sub frame 21 is connected to the right-side rear side frame 2 via the right-side support panel 25, and the left-side sub frame 21 is connected to the left-side rear side frame 2 via the left-side support panel 25. The sub frame 21 extends rearward from a position in back of a rear end of the rear side frame 2, passing below the wheel house panel 8 which extends rearward from the rear side frame 2.

In the present embodiment, a bush holding portion 21A, which is of a roughly cylindrical shape extending in the vertical direction and holds a bush therein, is provided at a front end of each of the sub frames 21. The bush holding portion 21A is fixed to a rear end portion of a gusset frame 50. The bush holding portion 21A is arranged between the rear end portion of the gusset frame 50 and the support panel 25 and fixed to the rear end portion of the gusset frame 50 and the support panel 25.

The rear-suspension cross member 22 is positioned behind the fuel tank 6. That is, the fuel tank 6 is arranged in an area enclosed by the pair of rear side frames 2, 2 and the rear-suspension cross member 22.

The vehicle V is provided with a pair of right-and-left protection member 40, 40 to protect the fuel tank 6. These protection members 40, 40 are arranged on both lateral sides, i.e., on both outward sides, in the vehicle width direction, of the fuel tank 6.

(Protection Member and Its Surrounding Structure)

Figure 3:
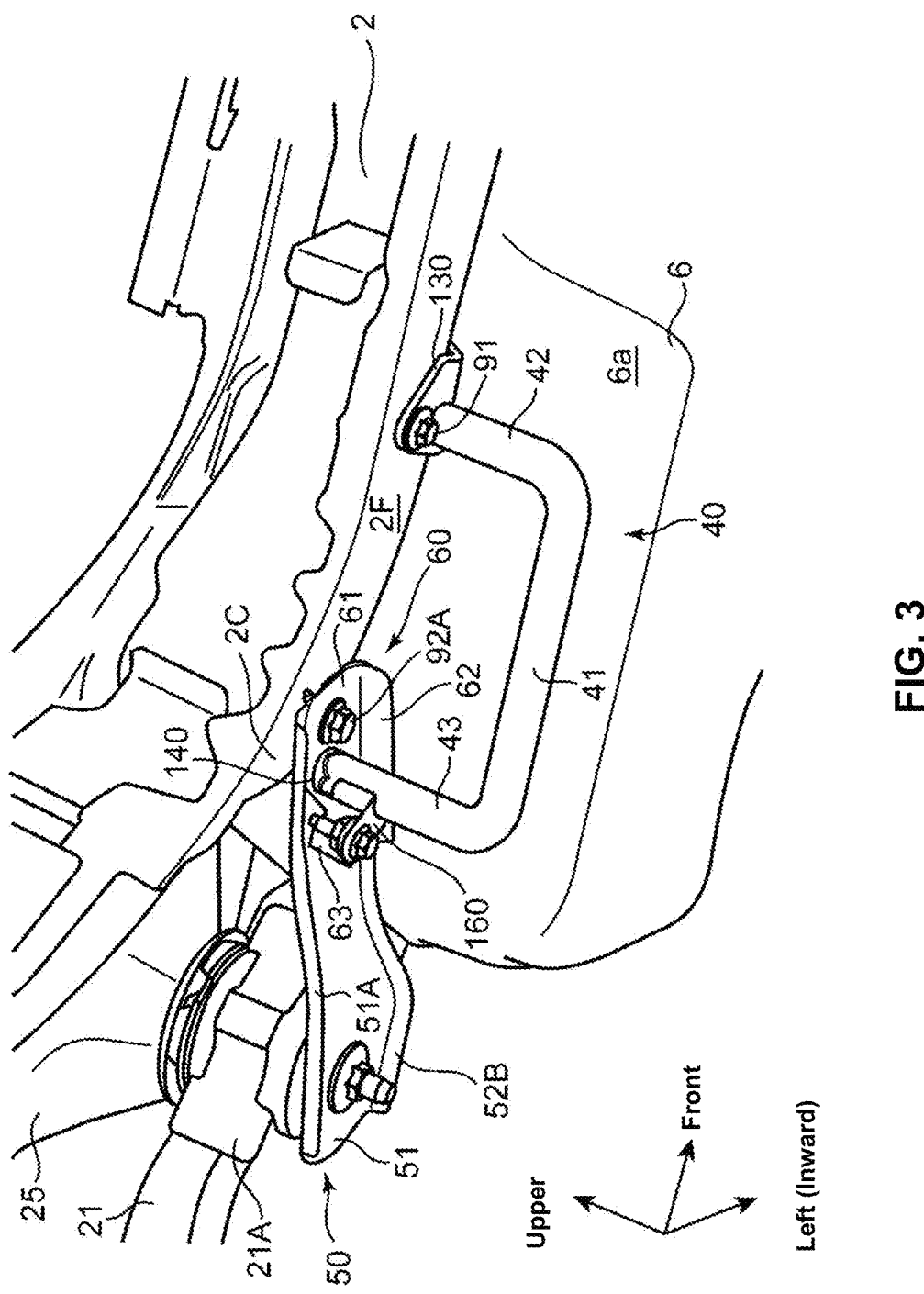
FIG. 3 is a schematic perspective view of a part of the vehicle rear portion, when viewed from an outward side, in a vehicle width direction, thereof.
Figure 4:
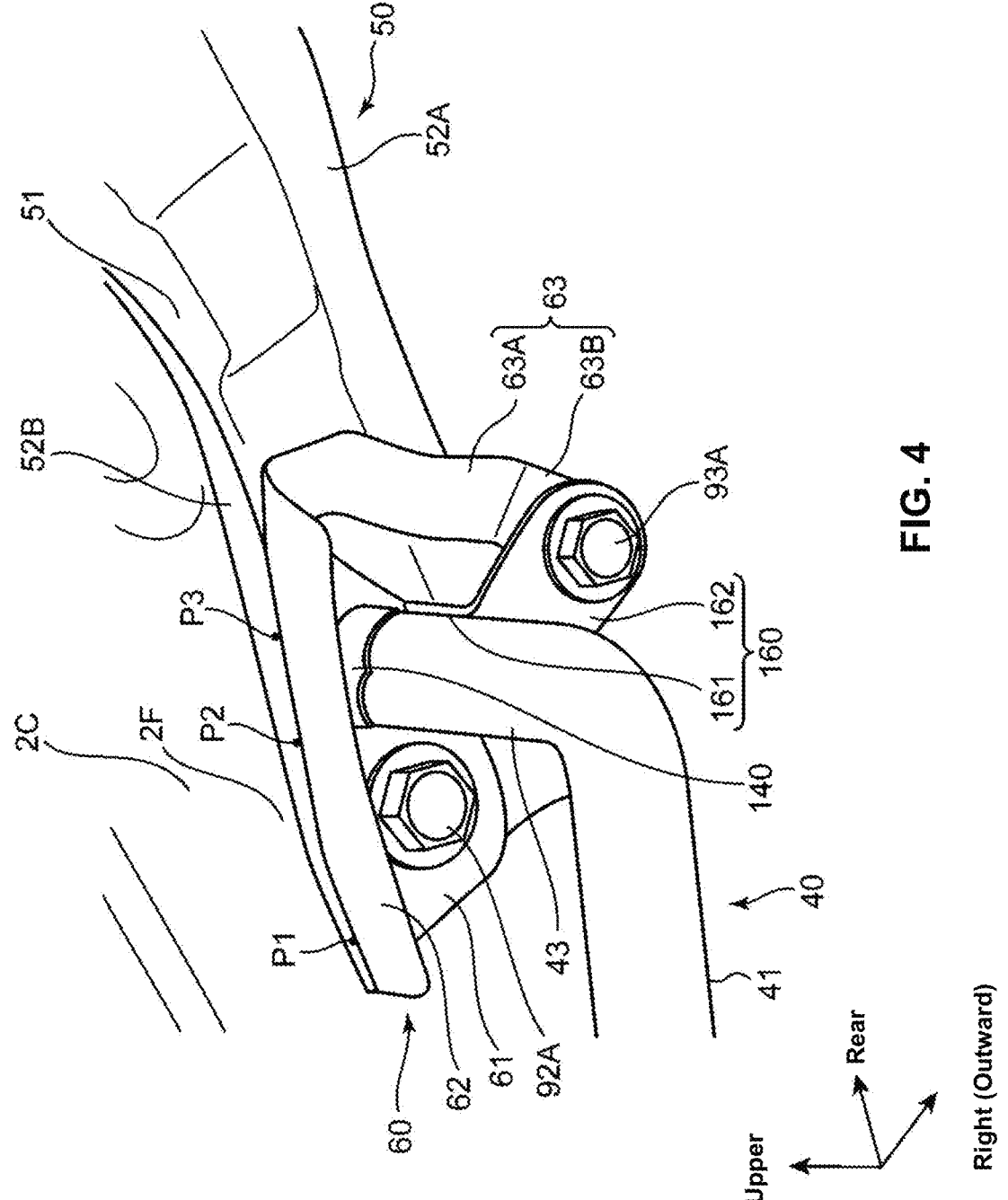
FIG. 4 is a schematic perspective view around a rear end portion of a protection member, when viewed from an inward side, in the vehicle width direction, thereof.
Figure 5:
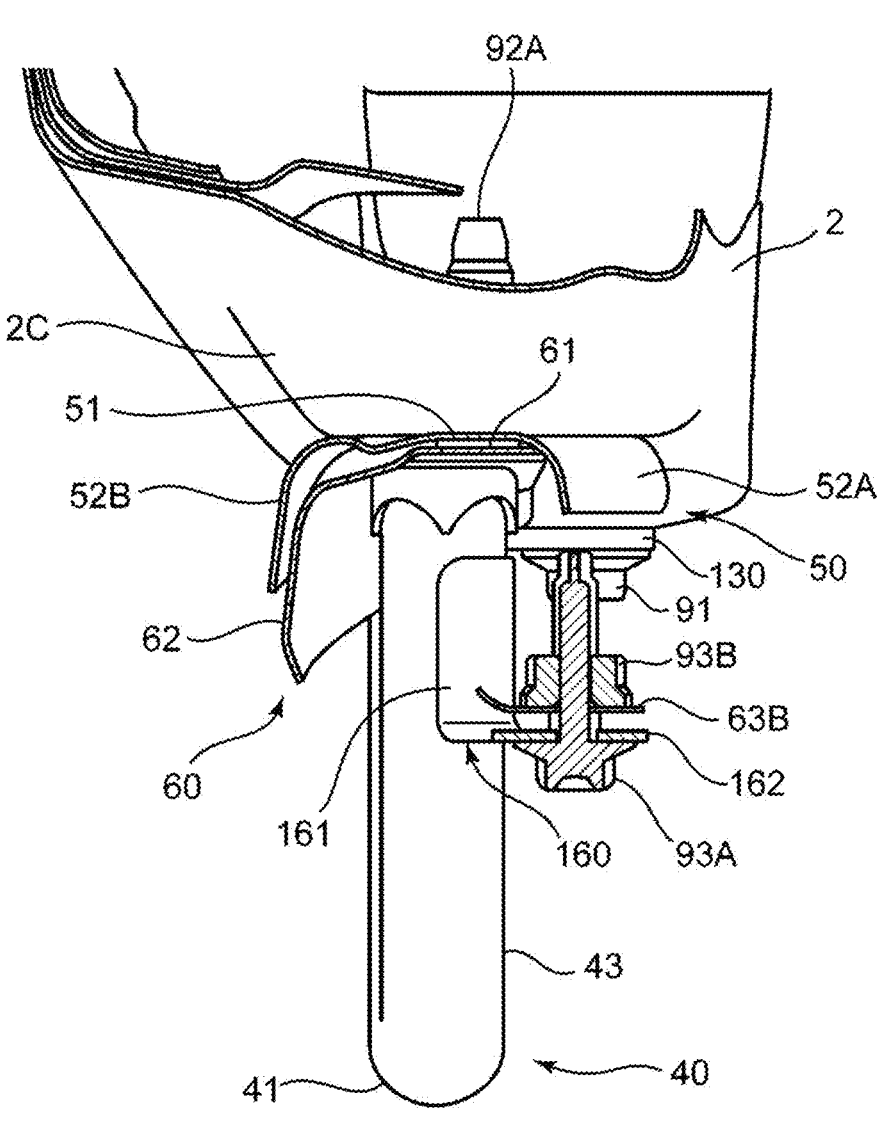
FIG. 5 is a schematic sectional view taken along line V-V of FIG. 2.
Figure 6:
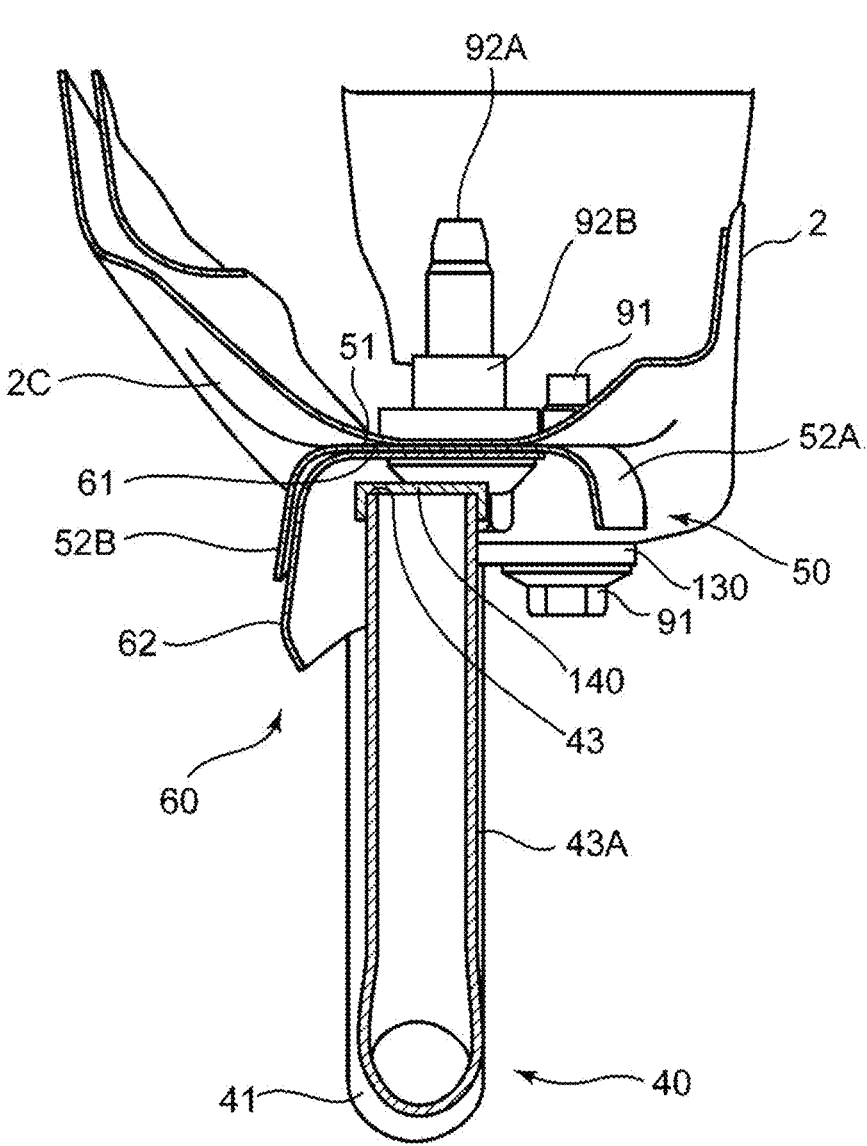
FIG. 6 is a schematic sectional view taken along line VI-VI of FIG. 2.
Figure 7:
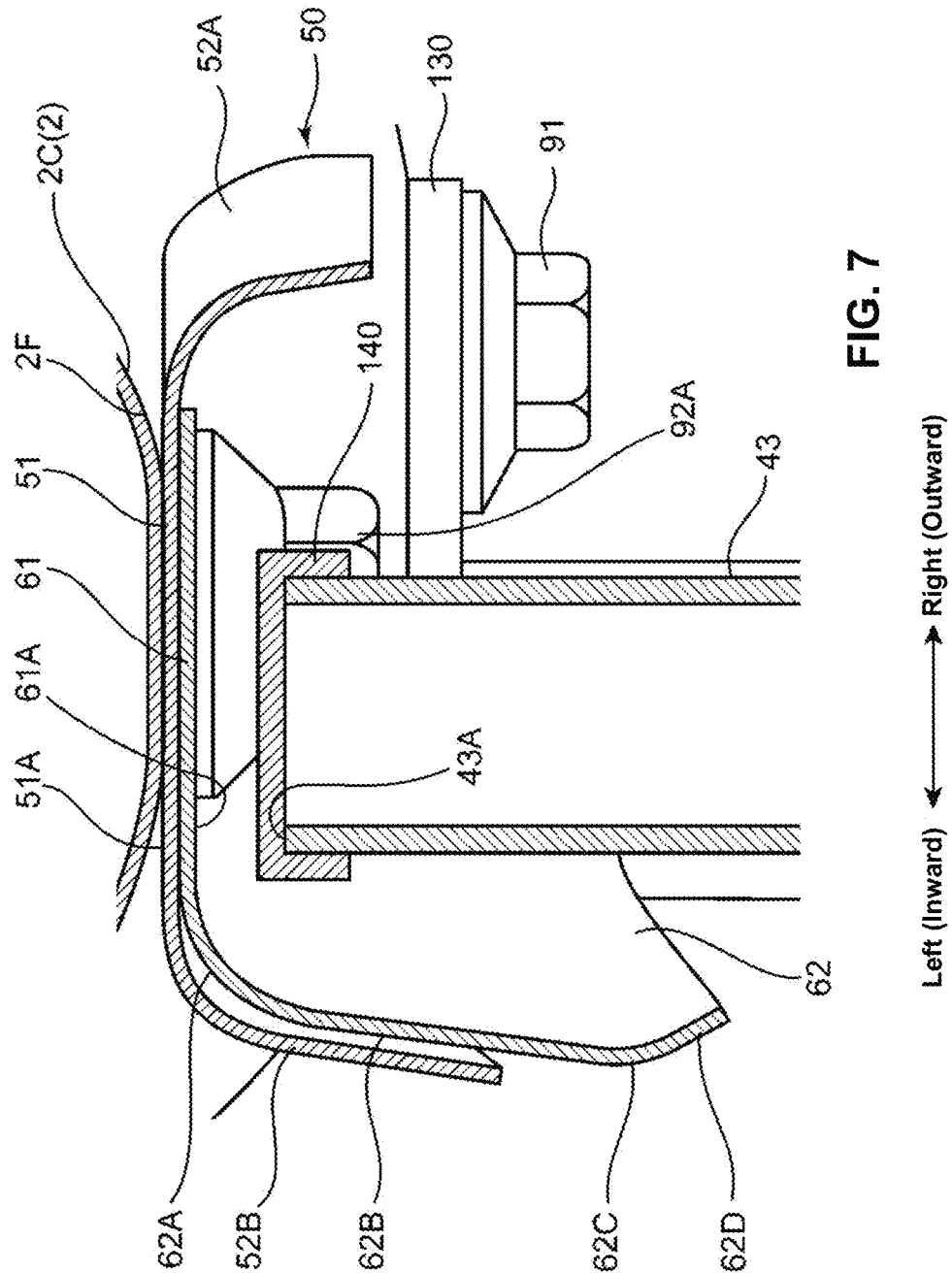
FIG. 7 is an enlarged view of a part of FIG. 6.

Next, the protection member 40 and its surrounding structure will be described. FIG. 3 is a schematic perspective view of a part of the rear portion of the vehicle V, when viewed from a right side, i.e., an outward side, in a vehicle width direction, thereof. FIG. 4 is a schematic perspective view around a rear end portion of the right-side protection member 40, when viewed from a left side, i.e., an inward side, in the vehicle width direction, thereof. FIG. 5 is a schematic sectional view taken along line V-V of FIG. 2. FIG. 6 is a schematic sectional view taken along line VI-VI of FIG. 2. FIG. 7 is an enlarged view of a part of FIG. 6.

The two protection members 40, 40 have a symmetrical structure. The two protection members 40, 40 are arranged at respective outward separated positions from both side faces, in the lateral direction, of the fuel tank 6 such that they face these both side faces of the fuel tank 6. Specifically, the right-side protection member 40 is arranged at a rightward separated position from a right side face 6a of the fuel tank 6 such that it faces the right side face 6a of the fuel tank 6. Likewise, the left-side protection member 40 is arranged at a leftward separated position from a left side face 6b of the fuel tank 6 such that it faces the left side face 6b of the fuel tank 6. Each of the protection members 40, 40 is arranged in front of each of the rear wheels 1.

The protection member 40 is of a roughly U shape which is open upward. Specifically, the protection member 40 comprises a contact portion 41 which extends in the longitudinal direction. The protection member 40 comprises a front-side extension portion 42 which extends upward from a front end of the contact portion 41 and a rear-side extension portion 43 which extends upward from a rear end of the contact portion 41.

The contact portion 41 has a roughly pole shape which extends in the longitudinal direction. The contact portion 41 is arranged such that its part is located below the fuel tank 6. In the present embodiment, the contact portion 41 is arranged such that the level (height position) of a center, in the vertical direction, thereof is mostly equal to the level (height position) of a lower edge of the fuel tank 6.

Each of the front-side extension portion 42 and the rear-side extension portion 43 has the roughly pole shape which extends in the vertical direction. These extension portions 42, 43 extend to around a center of the fuel tank 6 from the end portions, in the longitudinal direction, of the contact portion 41.

In the protection member 40, the contact portion 41 and the two extension portions 42, 43 are formed integrally. In the present embodiment, the contact portion 41 and the two extension portions 42, 43 are made by bending a round pipe, i.e., a cylindrical member. Specifically, the round pipe is bent at two points, in an axial direction, thereof, thereby forming the contact portion 41 at its middle part and also forming the front-side and rear-side extension portions 42, 43 at both sides of the contact portion 41. Herein, a bending angle of the round pipe is set at about 90 degrees, and the extension portions 42, 43 extend roughly upward from the both ends, in the longitudinal direction, of the contact portion 41. Further, in the present embodiment, the round pipe is bent along an arc such that each of continuous parts of the contact portion 41 to the extension portions 42, 43 has an arc shape which protrudes outward. Moreover, in the present embodiment, a seal member 140 is attached to an upper end portion 43A of the rear-side extension portion 43 so as to seal its opening.

The vehicle V is further provided with a pair of right-and-left gusset frames 50, 50, a pair of right-and-left brackets 60, 60, and a pair of right-and-left front-side support plates 130, 130. The protection member 40 is supported at the rear side frame 2 via these members 50, 60, 130. Specifically, the right-side protection member 40 is supported at the right-side rear side frame 2 via the right-side gusset frame 50, the right-side bracket 60, and the right front-side support member 130. The left-side protection member 40 is supported at the left-side rear side frame 2 via the left-side gusset frame 50, the left-side bracket 60, and the left front-side support member 130. The gusset frame 50 corresponds to a "second support member" of the present invention. Likewise, the bracket 60 corresponds to a "first support member," and a member which is comprised of the gusset fame 50 and the bracket 60 corresponds to a "support member" of the present invention.

Since a structure/arrangement of the two gusset frames 50, 50, the two brackets 60, 60, and the two front-side support plates 130, 130 is laterally symmetrical, hereafter, the structure/arrangement of these members provided as a right-side part of the vehicle V will be described.

The front-side support plate 130 is a roughly plate-shaped member and fixed to a lower face of the rear side frame 2 by a bolt 91 such that it extends along the lower face 2F of the rear side frame 2. The front-side extension portion 42 of the protection member 40 is joined to a lower face of the front-side support plate 130 by welding or the like in a state where its upper end portion contacts the lower face of the front-side support plate 130, and the front-side extension portion 42 is supported at the lower face of the rear side frame 2 via the front-side support plate 130 and the bolt 91.

The gusset frame 50 comprises a gusset bottom-wall portion 51 which extends roughly horizontally in the longitudinal direction. The gusset bottom-wall portion 50 is provided to extend over a whole part, in the longitudinal direction, of the gusset frame 50. Further, the gusset frame 50 comprises a pair of right-and-left gusset flanges 52A, 52B which extend downward from right-and-left both edges of the gusset bottom-wall portion 51. Specifically, the gusset frame 50 comprises the gusset outward flange 52A which extends downward with its base end corresponding to a right edge, i.e., an outward edge, in the vehicle width direction, of the gusset bottom-wall portion 51, and the gusset inward flange 52B which extends downward with its base end corresponding to a left edge, i.e., an inward edge, in the vehicle width direction, of the gusset bottom-wall portion 51. In the present embodiment, the gusset bottom-wall portion 51 and the gusset flanges 52A, 52B are formed integrally. For example, the gusset bottom-wall portion 51 and the gusset flanges 52A, 52B are formed at the gusset frame 50 by bending a sheet of plate-shaped member. The gusset bottom-wall portion 51 corresponds to a "second bottom wall portion" of the present invention, and the gusset inward flange 52B corresponds to a "second vertical wall portion" of the present invention.

The gusset frame 50 is arranged below the rear side frame 2. The gusset frame 50 is arranged such that a front end portion of the gusset bottom-wall portion 51 is located above the rear-side extension portion 43. That is, the gusset bottom-wall portion 51 comprises a gusset-side facing portion 51A which is located above the upper end portion 43A of the rear-side extension portion 43 and faces this portion 43A. The gusset-side facing portion 51A faces, in the vertical direction, a whole part of the upper end portion 43A of the rear-side extension portion 43. The gusset bottom-wall portion 51 and the gusset frame 50 extend rearward from a forward position of the upper end portion 43A of the rear-side extension portion 43. In the present embodiment, the gusset bottom-wall portion 51 and the gusset frame 50 extend, in the longitudinal direction, from a rearward position of a center of the protection portion 40 to a rearward position of the front end of the rear wheel 1. The gusset-side facing portion 51A corresponds to a "second facing portion" of the present invention.

The rear side frame 2 is provided with a gusset-frame fixation portion 2C which protrudes downward at around a border between the rear end portion 2A curving obliquely rearward-and-upward and its forward portion. A front end portion of the gusset bottom-wall portion 51 is fixed to a lower face of the gusset-frame fixation portion 2C, i.e., the lower face 2F of the rear side frame 2, in a state where this front end portion is positioned along this lower face 2F, and the gusset frame 50 is supported at the rear side frame 2. In the present embodiment, the gusset bottom-wall portion 51 and the front end portion of the gusset frame 50 are fastened to the lower face 2F of the rear side frame 2 by a bolt 92A and a nut 92B. The bolt 92A fastens a portion of the gusset bottom-wall portion 51 which is located on the forward side, in the longitudinal direction, of the gusset-side facing portion 51A, i.e., the portion located on the forward side, in the longitudinal direction, of the upper end portion 43A of the rear-side extension portion 43, to the lower face 2F of the rear side frame 2.

The gusset flanges 52A, 52B extend downward mostly straight from right-and-left both edges of the gusset bottom-wall portion 51. The gusset flanges 52A, 52B are provided over a mostly whole part, in the longitudinal direction, of the gusset bottom-wall portion 51, i.e., the gusset frame 50. Each height size of the gusset flanges 52A, 52B is set to be smaller than a size, in a width direction (the lateral direction), of the gusset bottom-wall portion 51.

The bracket 60 comprises a bracket bottom wall-portion 61, a bracket flange 62, and a holder portion 63. In the present embodiment, the bracket bottom wall-portion 61, the bracket flange 62, and the holder portion 63 are formed integrally. For example, these portions 61, 62, 63 are formed at the bracket 60 by bending a sheet of plate-shaped member. The bracket bottom-wall portion 61 corresponds to a "bottom wall portion" of the present invention, and the bracket flange 62 corresponds to a "vertical wall portion" of the present invention.

The bracket 60 extends rearward from substantially the same position, in the longitudinal direction, as a front end of the gusset frame 50. Herein, the longitudinal size of the bracket 60 is shorter than that of the gusset frame 50, and a position of a rear end of the bracket 60 is located in front of a position of a rear end of the gusset frame 50. In the present embodiment, the rear-end position of the bracket 60 is located in front of a longitudinal center of the gusset frame 50.

The bracket bottom-wall portion 61 is of a plate shape which extends in the longitudinal direction along a lower face of the gusset bottom-wall portion 51. The bracket bottom-wall portion 61 is provided over a whole part, in the longitudinal direction, of the bracket 60. The bracket 60 is arranged such that the bracket bottom-wall portion 61 is located above the rear-side extension portion 43. That is, the bracket 60 has a bracket-side facing portion 61A which is located above the upper end portion 43A of the rear-side extension portion 43 and faces this portion 43A. The bracket-side facing portion 61A faces a whole part of the upper end portion 43A of the rear-side extension portion 43 in the vertical direction. As described above, the upper end portion 43A of the rear-side extension portion 43 faces the gusset-side facing portion 51A, and the gusset-side facing portion 51A and the bracket-side facing portion 61A face each other in the vertical direction. Further, the gusset-side facing portion 51A and the bracket-side facing portion 61A face each other over their whole parts. The bracket-side facing portion 61A corresponds to a "facing portion" of the present invention.

The bracket bottom-wall portion 61 is fixed to the lower face 2F of the gusset-frame fixation portion 2C in a state where it extends along the lower face of the gusset bottom-wall portion 51, and the bracket 60 is supported at the rear side frame 2. In the present embodiment, the bracket bottom-wall portion 61 is fixed to the lower face 2F of the gusset-frame fixation portion 2C by a bolt 92A and a nut 92B which fasten the gusset bottom-wall portion 51 to the lower face 2F of the rear side frame 2. That is, the gusset bottom-wall portion 51 and the bracket bottom-wall portion 61, i.e., the gusset frame 50 and the bracket 60 are fastened together to the lower face 2F of the rear side frame 2 by the bolt 92A and the nut 92B. These bolt-and-nut 92A, 92B correspond to a "fastening member" of the present invention.

The bracket flange 62 has a roughly plate shape which extends downward from a left edge, i.e., an inward edge, in the vehicle width direction, of the bracket bottom-wall portion 61. That is, the bracket flange 62 has the plate shape and extends downward with its base end corresponding to the left edge, i.e., the inward edge, in the vehicle width direction, of the bracket bottom-wall portion 61.

The bracket flange 62 extends in the vertical direction along a right face, i.e., an outward face, in the vehicle width direction, of the gusset inward flange 52B. The bracket flange 62 and the gusset inward flange 52B extend downward from slightly above an upper end of the rear-side extension portion 43 at a position which is leftward separated, i.e., inward, in the vehicle width direction, separated from the rear-side extension portion 43. Herein, the vertical size of the bracket flange 62 is larger (longer) than that of the gusset inward flange 52B, and the bracket flange 62 extends downward beyond the gusset inward flange 52B. In the present embodiment, the vertical size of the gusset inward flange 52B is set at about one fifth (⅕) of that of the rear-side extension portion 43, and the vertical size of the bracket flange 62 is set at about one third (⅓) of that of the rear-side extension portion 43.

The bracket 60 and the gusset frame 50 are joined together. In the present embodiment, the bracket flange 62 and the gusset inward flange 52B are welded together at plural positions.

Figure 8:
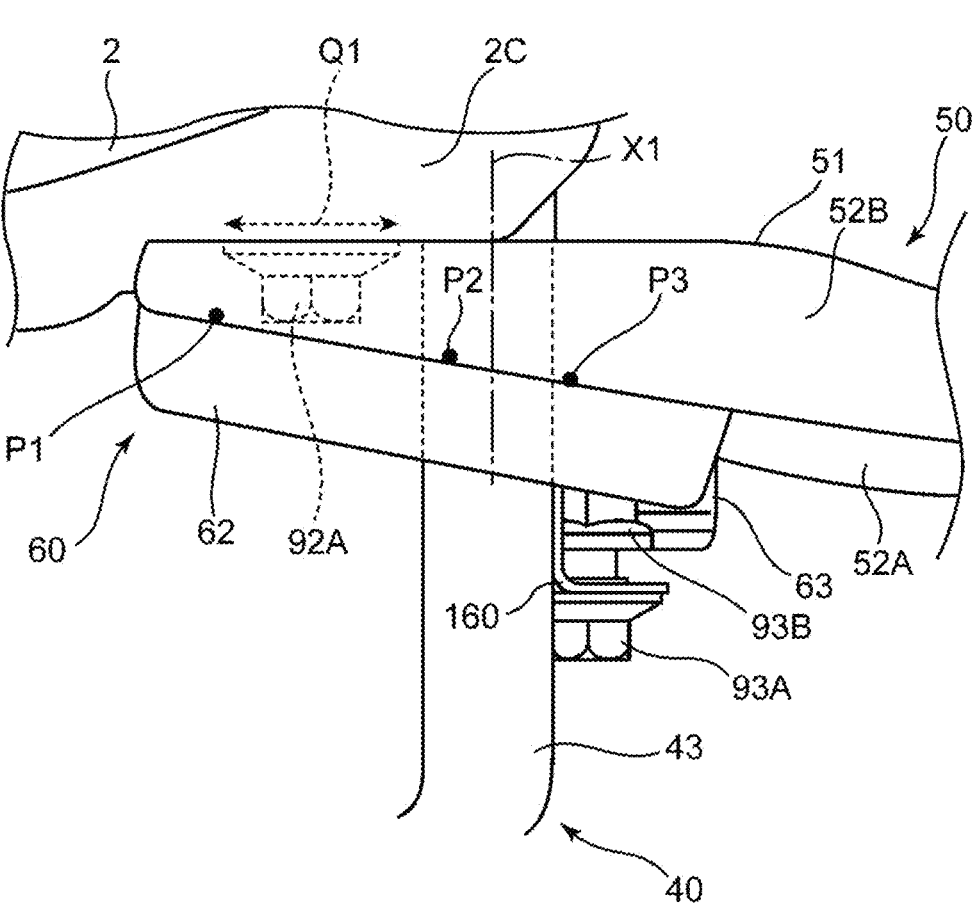
FIG. 8 is a schematic side view around the rear end portion of the protection member, when viewed from the inward side, in the vehicle width direction, thereof.

FIG. 8 is a schematic side view around the front end portion of the gusset frame 50, when viewed from the left side, i.e., the inward side, in the vehicle width direction, thereof. In the present embodiment, the bracket flange 62 and the gusset inward flange 52B are welded together at three welding points P1, P2, P3 aligned in the longitudinal direction. Hereafter, a point where the gusset bottom-wall portion 51 and the bracket bottom-wall portion 61 are fastened to the lower face 2F of the rear side frame 2 by the bolt 92B and the nut 92B and also overlap the bolt 92A in the vertical direction will be referred to as a fastening point Q1.

The position of the first welding point P1 among the three welding points P1-P3 is located on the forward side of the bolt 92A, i.e., on the forward side of the fastening point Q1 in the longitudinal direction. Further, the position of the first welding point P1 is set to be located on the forward side of the gusset-side facing portion 51A, the bracket-side facing portion 61A, and the upper end portion 43A of the rear-side extension portion 43.

The position of the rearmost third welding point P3 among the three welding points P1-P3 is located on the rearward side of the bolt 92A, i.e., on the rearward side of the fastening point Q1 in the longitudinal direction. Further, the position of the third welding point P3 is set to be located on the rearward side of the upper end portion 43A of the rear-side extension portion 43, the gusset-side facing portion 51A, and the bracket-side facing portion 61A. More specifically, the position of the third welding point P3 is set to be located on the rearward side of respective central positions X1 of the upper end portion 43A of the rear-side extension portion 43, the gusset-side facing portion 51A, and the bracket-side facing portion 61A.

The position of the second welding point P2 between the first welding point P1 and the third welding point P3 is located slightly on the rearward side, in the longitudinal direction, of the bolt 92A, i.e., the fastening point Q1. Further, the position of the second welding point P2 is set to be located on the forward side, in the longitudinal direction, of the respective central positions of the upper end portion

43A of the rear-side extension portion 43, the gusset-side facing portion 51A, and the bracket-side facing portion 61A and also on the rearward side, in the longitudinal direction, of the respective front-end positions of the upper end portion 43A of the rear-side extension portion 43, the gusset-side facing portion 51A, and the bracket-side facing portion 61A.

The bracket flange 62 comprises a first portion 62A which extends downward from a left edge, i.e., an inward edge, in the vehicle width direction, of the bracket bottom-wall portion 61, a second portion 62B which extends downward from a lower end of the first portion 62A, a third portion 62C which extends downward from a lower end of the second portion 62B, and a fourth portion 62D which extends downward from a lower end of the third portion 62C. The third portion 62C corresponds to a "curve portion" of the present invention, and the fourth portion 62D corresponds to an "extension portion" of the present invention.

The second portion 62B extends roughly along a flat face which slants obliquely downward-and-leftward and has a roughly flat-face shape such that its lower side is positioned on the inward side, in the vehicle width direction, thereof. Meanwhile, the fourth portion 62D has a laterally symmetrical structure to the second portion 62B, that is—the fourth portion 62D extends roughly along a flat face which slants obliquely downward-and-rightward and has a roughly flat-face shape such that its lower side is positioned on the outward side, in the vehicle width direction, thereof. The third portion 62C which interconnects the second portion 62B and the fourth portion 62D and is arranged at a middle position, in the vertical direction, of the bracket flange 62 is curved such that it protrudes leftward, i.e., toward the inward side, in the vehicle width direction, thereof.

According to the above-described structure, the bracket flange 62 is configured to protrude leftward, i.e., toward the inward side, in the vehicle width direction, thereof as a whole. Herein, the first portion 62A is cured obliquely leftward-and-downward from a left edge of the bracket bottom-wall portion 61.

Moreover, according to the above-described structure, the fourth portion 62D extending toward a tip side of the bracket flange 62 and downward from the third portion 62C is positioned on the right side, i.e., the outward side, in the vehicle width direction, of the third portion 62C. In the present embodiment, as described above, the bracket flange 62 extends downward with its base end corresponding to the left edge of the bracket bottom-wall portion 61, and its lower end constitutes a tip of the bracket flange 62. Thereby, a portion of the bracket flange 62 which extends toward the tip side from the third portion 62C matches the portion of the bracket flange 62 which is positioned on a lower side, in the vertical direction, of the third portion 62C.

The third portion 62C is provided at a position below a lower end of the gusset inward flange 52B. In the present embodiment, the third portion 62C is provided at a lower position than a center, in the vertical direction, of the bracket flange 62.

The holder portion 63 supports the rear-side extension portion 43. That is, the rear-side extension portion 43 is supported at the bracket 60 by the holder portion 63 and also supported at the rear side frame 2 via the bracket 60. The holder portion 63 comprises a first extension portion 63A which extends downward from a rear end portion of the bracket bottom-wall portion 61 and a second extension portion 63B which extends roughly horizontally from a lower edge of the first extension portion 63A. The first extension portion 63A extends downward from the left edge, i.e., the outward edge, in the vehicle width direction, of the bracket bottom-wall portion 61, and the second extension portion 63B extends obliquely forward-and-leftward, i.e., toward a forward-and-outward, in the vehicle width direction, side from the lower edge of the first extension portion 63A. Herein, the holder portion 63 including the first extension portion 63A and the second extension portion 63B is of a plate shape.

The holder portion 63 is fastened to a connection member 160 which is fixed to the rear-side extension portion 43 by a bolt 93A and a nut 93B, and supports the rear-side extension portion 43 via the bolt 93A, the nut 93B, and the connection member 160.

Specifically, the connection member 160 comprises a plate-shaped first connection piece 161 which extends in the vertical direction along an outer peripheral surface of the rear-side extension portion 43 and a second connection piece 162 which extends roughly horizontally from a lower edge of the first connection piece 161. The first connection piece 161 is arranged along a right part, i.e., an outward part, in the vehicle width direction, of the outer peripheral surface of the rear-side extension portion 43, and joined to this part by welding or the like. The second connection piece 162 extends obliquely rearward-and-leftward, i.e., toward a rearward-and-outward, in the vehicle width direction, side from the lower edge of the first connection piece 161. The second connection piece 162 is arranged below and in parallel to the second extension portion 63B of the holder portion 63, and the second connection piece 162 and the second extension portion 63B are fastened by the bolt 93A and the nut 93B. Herein, in the illustrated example, the second connection piece 162 and the second extension portion 63B are connected in a state where these are separated from each other in the vertical direction.

By the above-described connection of the second connection piece 162 and the second extension portion 63B, the rear-side extension portion 43 is supported at the holder portion 63, thereby the bracket 60. Further, the rear-side extension portion 43 is supported at the rear side frame 2 via the bracket 60.

Effects and Others

As described above, in the lower structure according to the present embodiment, the two protection members 40 are supported at the rear side frames 2 in a state where these protection members 40 face the both-side faces 6a, 6b, in the lateral direction, of the fuel tank 6. Further, the part of the contact portion 41 of each of the protection members 40 is arranged below the fuel tank 6. Accordingly, the fuel tank 6 can be protected by the protection member 40. Specifically, when an obstacle collides with the vehicle V from the vehicle side, the contact of the fuel tank 6 with the obstacle can be prevented by the protection member 40. Further, when the vehicle V passes through the step or the like on the road surface, a state where there occurs a gap between the step or the like and the fuel tank 6 can be properly maintained by the contact of the contact portion 41 of the protection member 40 with the step or the like, thereby preventing any contact of the fuel tank 6 with the step or the like.

Further, in the above-described embodiment, the gusset frame 50 and the bracket 60 are arranged between the upper end portion 43A of the rear-side extension portion 43 of the protection member 40 and the rear side frame 2, and the gusset frame 50 and the bracket 60 are respectively provided with the gusset-side facing portion 51A and the bracket-side facing portion 61A which face the upper end portion 43A of the rear-side extension portion 43. Accordingly, it can be avoided that the collision load is directly applied to the rear side frame 2 from the rear-side extension portion 43, thereby suppressing deformation of the rear side frame 2. That is, a portion of the rear side frame 2 where the collision load is transmitted from the protection member 40 is reinforced by the gusset frame 50 and the bracket 60, so that the deformation of the rear side frame 2 can be suppressed.

In particular, in the present embodiment, in addition to the bracket bottom-wall portion 61 extending along the lower face 2F of the rear side frame 2, the bracket 60 is provided with the bracket bottom-wall portion 61 which has its base end corresponding to the inward edge, in the vehicle width direction, of the bracket bottom-wall portion 61 and extends downward, so that the rigidity of the bracket 60 is increased. Accordingly, the deformation of the bracket 60, thereby the deformation of the rear side frame 2, can be suppressed.

Moreover, in the present embodiment, the bracket flange 62 is provided with the third portion 62C being curved so as to protrude inwardly, in the vehicle width direction, thereof, and the fourth portion 62D extending toward the tip side of the bracket flange 62 from the third portion 62C is positioned on the outward side, in the vehicle width direction, of the third portion 62C. Accordingly, the fuel tank 6 can be securely protected.

Figure 9:
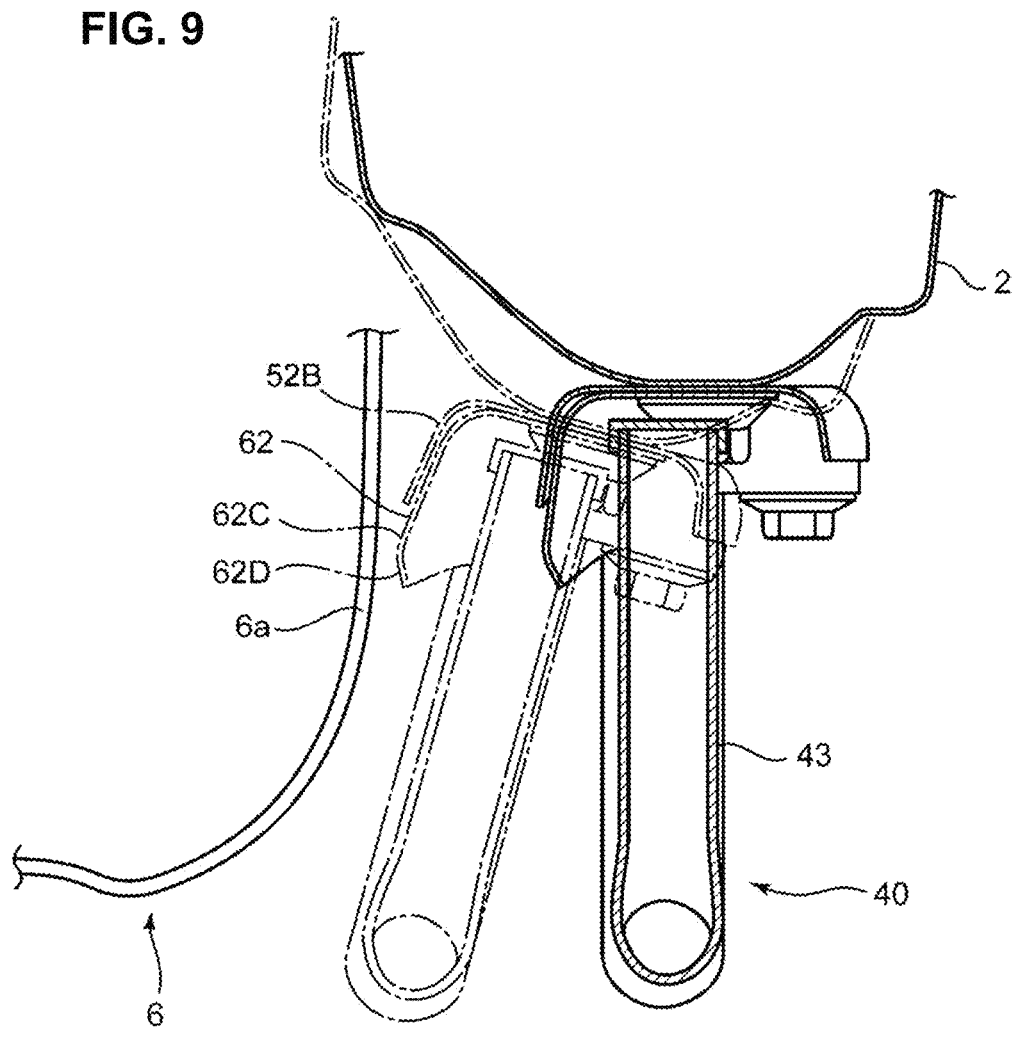
FIG. 9 is a schematic sectional view for explaining effects.

Hereafter, the specific description will be conducted referring to FIG. 9. FIG. 9 is a sectional view corresponding to FIG. 6. When the obstacle collides with the vehicle V from the vehicle side and its collision load is large, the rear side frame 2 is displaced from a state illustrated by a solid line to another state illustrated by a dotted line in FIG. 9. That is, the rear side frame 2 is deformed such that its lower end portion moves inwardly, in the vehicle width direction, thereof. As the rear side frame 2 is deformed inwardly, in the vehicle width direction, thereof, the protection member 40, the gusset frame 50, and the bracket 60 which are supported at the rear side frame 2 also swing together inwardly, in the vehicle with direction, thereof around a position located above those as shown by the dotted line in FIG. 9. Accordingly, the bracket flange 62 moves toward the fuel tank 6. Thus, there is a case where the bracket flange 62 contacts the fuel tank 6 when the collision load is especially large or the like. Herein, if a relatively-sharp tip portion of the bracket flange 62 vigorously contacts the fuel tank 6 first, there is a concern that the fuel tank 6 may be damaged by this tip portion. However, in the present embodiment, as described above, the bracket flange 62 is provided with the third portion 62C being curved so as to protrude inwardly, in the vehicle width direction, thereof, and also the fourth portion 62D extending toward the tip side of the bracket flange 62 from the third portion 62C is positioned on the outward side, in the vehicle width direction, of the third portion 62C. Accordingly, not the sharp tip of the bracket flange 62 but the third portion 62C can be made to contact the fuel tank 6 first. Thus, according to the present embodiment, the sharp tip can be prevented from vigorously contacting the fuel tank 6, and also contacting of the third portion 62C with the fuel tank 6 suppresses the further swinging of the bracket 60, so that the sharp tip of the bracket flange 62 can be prevented from contacting the fuel tank 6.

Further, in the present embodiment, the fourth portion 62D, which is a portion of the bracket flange 62 which extends toward the tip side from the third portion 62C, is configured to extend downward. Accordingly, the shape of the bracket flange 62 can be made properly simple compared to a case where the portion extending toward the tip side from the third portion 62C is configured to extend upward.

Also, in the present embodiment, the gusset frame 50 is provided with the gusset outward flange 52A and the gusset inward flange 52B which extend downward with their base ends corresponding to the right-and-left edges, i.e., the both edges, in the vehicle width direction, thereof, so that the rigidity of the gusset frame 50 is increased as well as the bracket 60. Thereby, the deformation of the rear side frame 2 can be suppressed more securely.

Moreover, in the present embodiment, the third portion 62C is arranged below the lower end of the gusset inward flange 52B. Accordingly, in addition to increasing the rigidity of the gusset frame 50 by providing the gusset inward flange 52B at the gusset fame 50, the third portion 62C can be made to contact the fuel tank 6 before the sharp lower end of the gusset inward flange 52B contacts the fuel tank 6. Thereby, it can be prevented that the fuel tank 6 is damaged by its contact with the sharp lower end of the gusset inward flange 52B.

In the present embodiment, the bracket 60 and the gusset frame 50 are fastened to the rear side frame 2 by the common bolt 92A and nut 92B. Thereby, the structure can be made simple compared to a case where they are fastened to the rear side frame 2 individually. Further, in the present embodiment, the bracket 60 and the gusset frame 50 are joined together at the first welding point P1 and the second welding point P2 which are positioned on the forward side of the fastening point Q1 where they are fastened by the bolt 92A and nut 92B and the third welding point P3 which is positioned on the rearward side of the fastening point Q1. Accordingly, the bracket 60 and the gusset frame 50 can be supported at the rear side frame 2 more stably by integrating these members 60, 50. Additionally, since the rigidity of each of these members 60, 50 can be increased, the deformation of the rear side frame 2 can be suppressed further.

Additionally, in the present embodiment, the fastening point Q1 is positioned on the forward side of the upper end portion 43A of the rear-side extension portion 43, the gusset-side facing portion 51A, and the bracket-side facing portion 61A, and the third welding point P3 is positioned on the rearward side of the respective central positions X1 of the upper end portion 43A of the rear-side extension portion 43, the gusset-side facing portion 51A, and the bracket-side facing portion 61A. Accordingly, the rigidity of each of these portions 51A, 61A can be increased by integrating these portions 51A, 61A. Thereby, the load applied to the gusset-side facing portion 51A and the bracket-side facing portion 61A from the upper end portion 43A of the rear-side extension portion 43 can be stably received at the gusset frame 50 and the bracket 60, so that the deformation of these members 50, 60, thereby the deformation of the rear side frame 2, can be suppressed.

Modified Examples

While the above-described embodiment describes that the gusset frame 50 and the bracket 60 are arranged between the rear-side extension portion 43 and the rear side frame 2, either one of those members 50, 60 may be provided between them 43, 2. Further, the gusset frame 50 and the bracket 60 may be formed integrally so that a single member is arranged between the rear-side extension portion 43 and the rear side frame 2.

Figure 10:
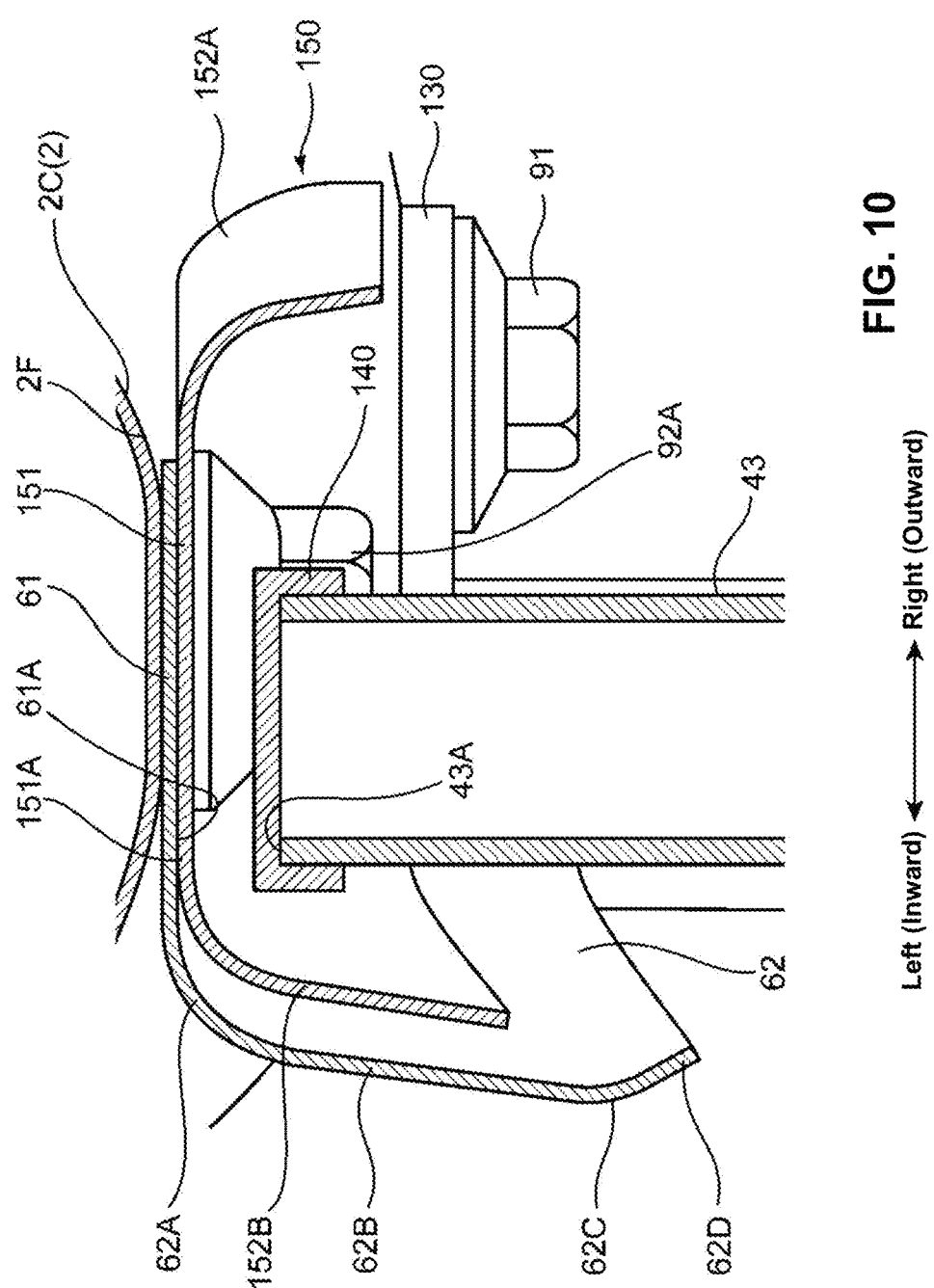
FIG. 10 is a schematic sectional view of a modified example, which corresponds to FIG. 7.

Further, the gusset frame may be arranged below the bracket 60 as shown in FIG. 10. Specifically, in place of the gusset frame 50 of the above-described embodiment, a gusset frame 150 (second support member) which is provided with a gusset bottom-wall portion 151 (second bottom-wall portion) may be fixed to the rear side frame 2. Herein, the gusset bottom-wall portion 151 extends below the bracket bottom-wall portion 61 along this portion 61 and faces the bracket-side facing portion 61A in the vertical direction. FIG. 10 is a schematic sectional view corresponding to FIG. 7. The other structure of the gusset frame 150 shown in FIG. 10 is mostly the same as the above-described embodiment. Specifically, the gusset frame 150 comprises, similarly to the above-described embodiment, a gusset inward flange 152B (second vertical-wall portion) which extends downward from an inward edge, in the vehicle width direction, of the gusset bottom-wall portion 151 to a position located above the third portion 62C and a gusset outward flange 52A which extends downward with its base end corresponding to the outward edge, in the vehicle width direction, of the gusset bottom-wall portion 51. Further, the bracket 60 and the gusset frame 150 are fastened together to the lower face 2F of the rear side frame 2 by the bolt 92A and the nut 92B. Moreover, in the modified example shown in FIG. 10 as well as the above-described embodiment, it is preferable that the bracket flange 62 and the gusset inward flange 152B be welded together at the plural points shown in FIG. 8.

While the above-described embodiment describes a case where the third portion 62C which is curved such that it protrudes inward, in the vehicle width direction, is provided at a middle position, in the vertical direction, of the bracket 60, this third portion 62C may be provided at the lower end portion of the bracket 60.

While the above-described embodiment describes a case where a fourth portion 62D extends downward from a lower end portion of the third portion 62C, this fourth portion 62D may be provided to extend obliquely upward-and-inward, in the vehicle width direction, from the third portion 62C.

While the above-described embodiment describes the case where the gusset frame 50 and the backet 60 are arranged between the rear-side extension portion 43 and the rear side frame 2, these members 50, 60 may be arranged between the front-side extension portion 42 and the rear side frame 2.

While the above-described embodiment describes the case where the gusset frame 50 and the backet 60 are fastened and joined together by the bolt 92A and the nut 92B, joining means is not limited to this. Further, specific position and the number of joining points are not limited to the above-described ones.

Regardless of the above-described embodiment in which the fuel tank 6 as the onboard member is protected by the protection member 40, any other member than the fuel tank 6 is applicable to the onboard member to be protected in the present invention.

Likewise, different from the above-described case where the contact portion 41 and the extension portions 42, 43 are formed integrally by the round pipe, these portions 42, 43 may be made separately and then joined together by welding or the like.

Moreover, the bending angle between the contact portion 41 and the extension portions 42, 43 is not limited to about 90 degrees shown in the above-described embodiment.

Additionally, the vehicle-body member which supports the extension portions 42, 43 and the protection member 40 is not limited to the rear side frame 2 and the gusset frame 50. The positional relationship between the rear wheel 1 and the protection member 40 is not limited to the above-described embodiment as well.

What is claimed is:

1. A lower structure of a vehicle, comprising:

an onboard member arranged below a floor panel of the vehicle;

a frame member arranged on an outward side, in a vehicle width direction, of the onboard member;

a protection member arranged below the frame member so as to face the onboard member from the outward side, in the vehicle width direction, thereof; and a support member fixed to a lower face of the frame member so as to support the protection member, wherein said support member comprises a bottom wall portion including a facing portion which faces an upper end portion of said protection member in a vertical direction and extending along the lower face of said frame member and a vertical wall portion having a base end thereof which corresponds to an inward edge, in the vehicle width direction, of said bottom wall portion and extending downward, and said vertical wall portion is provided with a curve portion protruding inward, in the vehicle width direction, and an extension portion extending toward a tip side from said curve portion and positioned on the outward side, in the vehicle width direction, of the curve portion.

2. The lower structure of the vehicle of claim 1, wherein said support member comprises a first support member including said bottom wall portion and said vertical wall portion and a second support member made of a different member from said first support member and fixed to the lower face of said frame member, and said second support member comprises a second bottom wall portion extending along said bottom wall portion at a position which is located below the bottom wall portion or between the bottom wall portion and the frame member and including a second facing portion which faces said facing portion in the vertical direction.

3. The lower structure of the vehicle of claim 2, wherein said second support member comprises a second vertical wall portion extending downward from an inward edge, in the vehicle width direction, of said second bottom wall portion.

4. The lower structure of the vehicle of claim 3, wherein a lower end of said second vertical wall portion is positioned above said curve portion.

5. The lower structure of the vehicle of claim 2, wherein said first support member and said second support member are fastened to said frame member by a common fastening member, and the first and second support members are joined together at respective forward-and-rearward positions, in a vehicle longitudinal direction, of said fastening member.

6. The lower structure of the vehicle of claim 5, wherein said first support member and said second support member are fastened to said frame member by said fastening member at a forward position, in the vehicle longitudinal direction, of said facing portion, and the first and second support members are joined together at a rearward position, in the vehicle longitudinal direction, of a longitudinal center of the facing portion.

7. The lower structure of the vehicle of claim 1, wherein said extension portion extends downward from said curve portion.

8. The lower structure of the vehicle of claim 2, wherein said extension portion extends downward from said curve portion.

9. The lower structure of the vehicle of claim 3, wherein said extension portion extends downward from said curve portion.

10. The lower structure of the vehicle of claim 4, wherein said extension portion extends downward from said curve portion.

11. The lower structure of the vehicle of claim 5, wherein said extension portion extends downward from said curve portion.

12. The lower structure of the vehicle of claim 6, wherein said extension portion extends downward from said curve portion.

* * * * *